US006553187B2

(12) United States Patent
Jones

(10) Patent No.: US 6,553,187 B2
(45) Date of Patent: Apr. 22, 2003

(54) ANALOG/DIGITAL CAMERA AND METHOD

(76) Inventor: Michael J Jones, 6970 NW. Diamond Pl., Corvallis, OR (US) 97330

( * ) Notice: Subject to any disclaimer, the term of this patent is extended or adjusted under 35 U.S.C. 154(b) by 0 days.

(21) Appl. No.: 09/738,210

(22) Filed: Dec. 15, 2000

(65) Prior Publication Data

US 2002/0076218 A1 Jun. 20, 2002

(51) Int. Cl.⁷ ................................................ G03B 17/48
(52) U.S. Cl. .......................................... 396/429; 348/64
(58) Field of Search ................................ 396/429, 430, 396/333, 323, 315, 319, 310; 348/64; 355/41

(56) References Cited

U.S. PATENT DOCUMENTS

| | | | | | |
|---|---|---|---|---|---|
| 5,023,656 A | * | 6/1991 | Terashita | ...................... | 355/41 |
| 5,130,745 A | * | 7/1992 | Cloutier et al. | ................ | 355/40 |
| 5,150,215 A | * | 9/1992 | Shi | ............... | 346/64 |
| 5,450,149 A | | 9/1995 | Cocca | ......................... | 354/106 |
| 5,530,501 A | * | 6/1996 | Bell | ............................ | 396/319 |
| 5,649,247 A | * | 7/1997 | Itoh et al. | ..................... | 396/311 |
| 5,749,006 A | * | 5/1998 | McIntyre et al. | ............ | 396/310 |
| 5,835,802 A | * | 11/1998 | Komori et al. | .............. | 396/319 |
| 5,915,852 A | | 6/1999 | Rogers | ..................... | 40/124.01 |
| 5,966,553 A | * | 10/1999 | Nishitani et al. | ............ | 396/303 |
| 5,968,719 A | * | 10/1999 | Nakamura | ................... | 430/394 |
| 6,014,165 A | * | 1/2000 | McIntyre et al. | .............. | 348/64 |

FOREIGN PATENT DOCUMENTS

| | | | | |
|---|---|---|---|---|
| DE | 4213694 | | 11/1992 | ........... G03B/17/48 |
| FR | 2411453 | | 8/1979 | ............ G08G/1/10 |

* cited by examiner

Primary Examiner—David M. Gray

(57) ABSTRACT

A camera having a digital image transducer and a film transport mechanism operable to advance film across a film focal plane. An imaging system generates an image on the image transducer, and generates an image on the film focal plane. A triggering system may operate to generate the images simultaneously, and the imaging system may include separate lenses having optical properties selected to generate images of essentially the same scene.

22 Claims, 1 Drawing Sheet

ANALOG/DIGITAL CAMERA AND METHOD

FIELD OF THE INVENTION

This invention relates to photography, and particularly to recording of digital images.

BACKGROUND AND SUMMARY OF THE INVENTION

In the field of photography, photographers have a choice between cameras that record and store analog images on conventional photo-sensitive film, and digital cameras that record and store digital image files using digital transducers such as charge coupled devices (CCD). Each type of camera has its advantages and disadvantages.

Digital cameras save money by not requiring expenditures on film or processing. Also, recorded digital images are available instantly for viewing, and may be transmitted as electronic signal data to remote locations for instantaneous use and viewing. Digital images are readily archived in compact media that requires only minimal physical space, and may be indexed with associated data files that make image retrieval practical, even from an archive containing an extensive multitude of stored image files. Stored data files preserve image qualities without gradual degradation over time, as occurs with chemically based conventional film and prints.

Digital cameras have certain limitations compared to conventional analog film-using cameras. Primarily, the images recorded by film-based cameras have much greater resolution, and capture far more image detail. While digital cameras have resolutions yielding detail on the order of one to several million pixels, conventional fine grain film and good quality lenses are capable of 10 to 100 times greater detail. Larger film formats are capable of recording an additional order of magnitude of detail. Another advantage of conventional film images is that a physical piece of film carrying an image is difficult to alter, while digital image files are readily altered, without discernible traces of tampering. Where security is important, a physical film image may be stored to preserve a chain of custody, which may be important for recorded images of legal evidentiary significance.

For some applications, both digital and analog cameras are used redundantly to provide the benefits of each. For law enforcement evidence gathering, such as at a crime scene, a photographer may record each scene twice, once with each type of camera. This provides a readily stored, indexed, and recalled electronic image, and avoids the cost of processing film, until and unless a recorded image becomes critical, such as where the fine detail or tamper resistance of an analog film image is needed. However, such practices are cumbersome, and require careful cross-indexing between stored digital and analog images. In addition, a photographer may not precisely frame images that are supposed to be the same, so that the direction, focus, and exposure are different. Further, images with different camera types are taken sequentially, so that there may be temporal changes in the scene being recorded during the interval.

The present invention overcomes the limitations of the prior art by providing a camera having both a digital image transducer and an analog film transport mechanism operable to advance film across a film focal plane. An imaging system generates an image on the image transducer, and generates an image on the film focal plane. A triggering system may operate to generate the images simultaneously, and the imaging system may include separate lenses having optical properties selected to generate images of essentially the same scene.

DETAILED DESCRIPTION OF A PREFERRED EMBODIMENT

Figure 1:
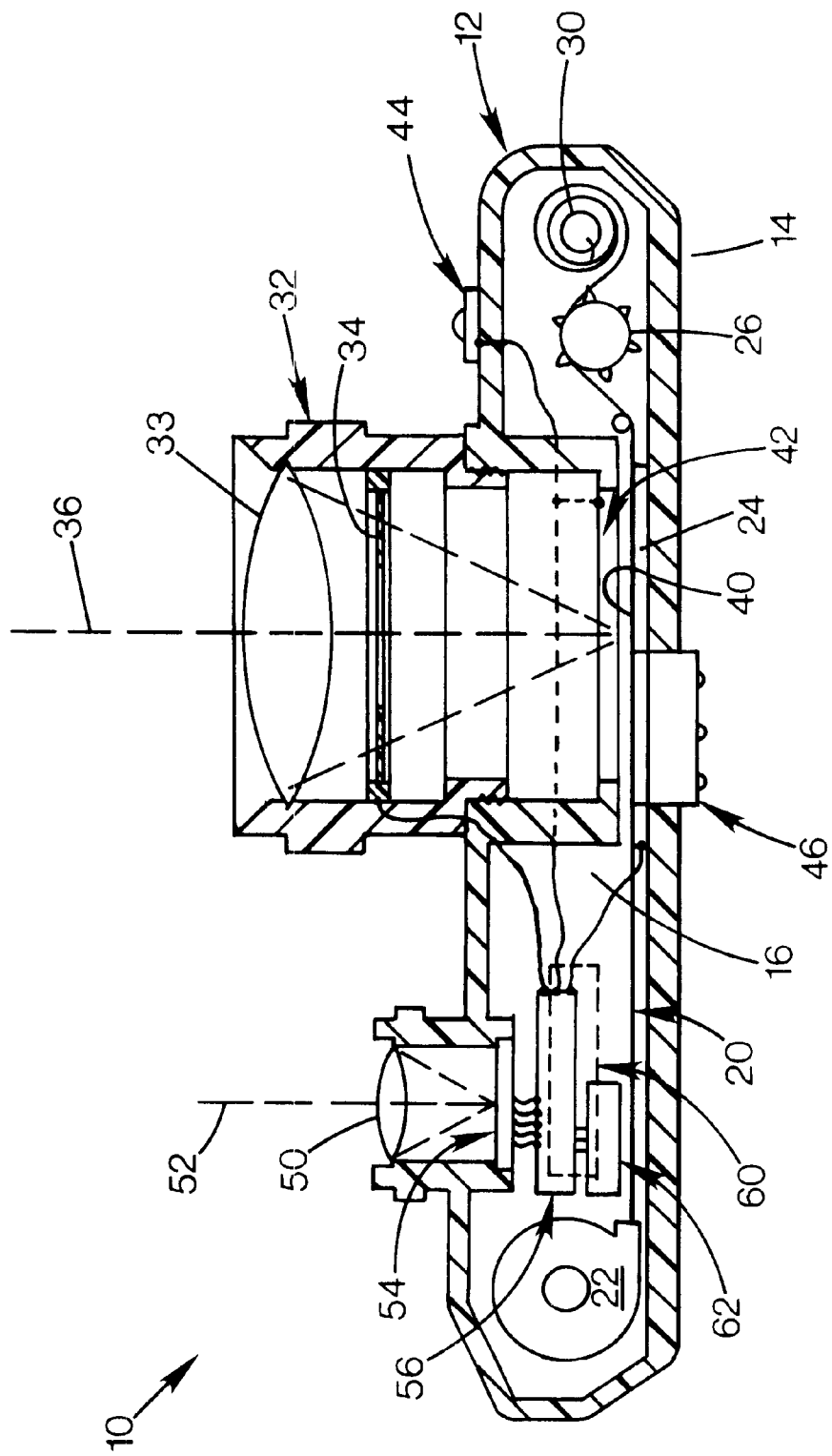
FIG. 1 is a simplified sectional view of a camera according to a preferred embodiment of the invention.

FIG. 1 shows a camera 10 according to a preferred embodiment of the invention. Like conventional analog cameras, the camera has a body 12 with a hinged lid 14 enclosing a body interior space 16. The body includes a film transport system that operates to draw a strip of photographic film 20 from a cartridge 22, across a platen 24, motivated by a drive sprocket 26, and collected by a take-up spool 30.

A first camera lens 32 includes an optical lens element 33 (illustrated as a simple lens, but preferably a multiple element assembly), an aperture control diaphragm 34, a focusing mechanism (not shown) that adjusts the position of the lens element along the optical axis 36 of the lens to generate a sharp image of a subject before the lens at a focal plane 40 defined by the front surface of the portion of the film that is overlaying the platen 24.

A focal plane shutter assembly 42 resides just forward of the film, between the film and the lens. The shutter normally prevents light from reaching the film, except for during a brief exposure period, in response to a user pressing a connected shutter release trigger 44. The trigger is shown as connected to the shutter via an electronic connection, but may be connected mechanically as in some conventional cameras.

A data imprinter 46 is positioned on the camera back, just behind one edge of the film, adjacent to the film platen. The data imprinter operates as in many conventional cameras, to imprint selected data on the film in conjunction with the exposure of an image. A light emitting display focuses certain characters or other symbols on the film, to imprint the data, which may include date, time, exposure, image ID number, and other data to be discussed below.

The camera essentially includes a second camera that operates to simultaneously record digital images of the same scene as recorded by the film-based camera elements. A lens 50 having a optical axis 52 parallel to the axis 36 of the first lens 33 focuses an image of the scene onto the surface of a CCD 54, which generates a digital data file corresponding to the formed image. The CCD is connected to control circuitry 56, which receives the data, and transfers it to a connected data storage module or port 60.

The control circuitry may be connected to a multitude of elements of the camera, in the manner of a highly automated film camera. The circuitry is connected to monitor and/or to control the focus, zoom, aperture, shutter speed, and any other image affecting function of either of the camera portions so that it can ensure that they generate images of suitably comparable exposure, field of view, depth of focus, etc. Some aspects may be set in one camera portion, and mimicked by the other. For instance, the user may set the focus, zoom, aperture, and shutter in the film camera portion, and the circuitry determines and enacts the settings needed to replicate that image in the digital portion.

The circuitry also connects to the shutter trigger so that actuation of the trigger simultaneously records the electronically generated image at the same instant that the shutter trips. The digital portion may have an optically identical lens to the film portion, with a CCD sized the same as the film frame. In the preferred embodiment, however, a smaller CCD is employed, and a comparably smaller and cost effective lens is employed to generate a comparable image. By using a smaller CCD and relatively moderate resolution, electronic memory capacity is maximized, and component costs are limited. Because the film portion records extremely high resolution images, the digital portion may record images of limited resolution, selected to be adequate at least to identify the content of the available film image, or for non-critical reference work. In other embodiments, the CCD operates at very high resolution comparable to the film portion. In still other embodiments, the CCD provides the higher image quality, with the film image serving as a security reference to ensure against tampering with the high resolution image.

The circuitry also operates to record additional information in conjunction with both images. A data generator circuit 62 includes a clock and connections to various of the camera components to record exposure data, and the time of exposure. Other data recorded optionally includes a unique camera identifier code (such as a digital expression of camera model number and manufacturing serial number), unique image identifier code (such as a sequential picture count), GPS-recorded position, camera orientation, and the like, to establish the precise circumstances of the images. In advanced embodiments, a sound recorder permits a brief audio memorandum to be dictated by the user in conjunction with each image. The audio is digitized by additional analog-to-digital conversion circuitry (not shown); the audio data is then appended to the associated digital image file, and is also transmitted to the data recorder 46 for recording on the margins of the film. Note that any such data converted to optical format and imaged on the film henceforth has the aforementioned advantages associated with analog film in terms of physical security, non-tamperability, etc.

The film-recorded data need not be in text form, but may be in a denser graphic format comparable to a machine-readable bar code. Alternatively, the data may be recorded on a magnetic stripe included along the edge of the film, or on the film cartridge. Upon processing, the encoded data may be made available to the user by the processor, either in printed or stored digital form allowing conversion to a readable text file, to verify consistency with the data recorded with the digital images.

Another advantage resulting from the invention is that after the analog film is processed, if the film prints are sorted, labeled and stored in physical storage in a sequence corresponding to unique camera/image identifiers, a specific analog image print may be quickly located in physical storage by first locating the associated digital image using computer search techniques on the metadata or digital image data associated with the image, and then using the unique camera and image identifier of the desired image to locate the analog print in physical storage.

While the above is discussed in terms of preferred and alternative embodiments, the invention is not intended to be so limited. For instance, the camera need not have two separate lens systems. A single lens may be used to generate the image on the film and an image on the CCD. This may be attained by a semi-transmissive mirror, by recording the images in rapid sequence, or by other means.

What is claimed is:

1. A camera comprising:

a digital image transducer;

a digital image storage;

a film transport mechanism operable to advance film across a film focal plane;

first and second imaging means for generating a first optical image on the digital image transducer and for generating a second optical image at the film focal plane; and, a trigger coupled to both a shutter associated with the film focal plane and circuitry associated with the digital image transducer to essentially simultaneously expose the film with the second optical image and generate and store a digital image representation of the first optical image, the digital image representation of the first optical image having higher resolution than the film as exposed with the second optical image, the film as exposed with the second optical image serving as a security reference to ensure against tampering of the digital image representation of the optical image.

2. The camera of claim 1 wherein the data imager further comprises a data encoder that creates a dense graphic format of the data associated with the generation of the digital image.

3. The camera of claim 2 wherein the dense graphic format further comprises a machine-readable bar code.

4. The camera of claim 1 wherein the imaging means comprises a first lens associated with the digital image transducer, and a second lens associated with the film focal plane.

5. The camera of claim 4 wherein the first and second lens are oriented with essentially-parallel optical axes so as to present substantially the same field of view to both the film focal plane and the digital image transducer.

6. The camera of claim 4 wherein the first lens generates a smaller image than does the second lens.

7. The camera of claim 4 wherein the first lens generates a lower resolution image than does the second lens.

8. The camera of claim 1 including a single camera body containing the transducer and the film transport mechanism.

9. The camera of claim 1 further comprising a data generator circuit that generates the data associated with generation of the digital image and stores the data in the digital image storage.

10. The camera of claim 1 wherein the data associated with generation of a digital image further comprises a camera identifier code.

11. The camera of claim 1 wherein the data associated with generation of a digital image further comprises an image identifier code.

12. The camera of claim 1 wherein the data associated with generation of a digital image further comprises camera exposure data.

13. The camera of claim 1 wherein the data associated with generation of a digital image further comprises a clock indication of the time of camera exposure.

14. An analog/digital camera comprising:

a digital image transducer;

a first lensing system that focuses an image upon the digital image transducer;

a second lensing system that focuses the image upon a film focal plane;

a shutter associated with the film focal plane;

a digital image storage associated with the digital image transducer; and, a trigger coupled to both the shutter and digital image transducer that, upon activation, essentially simultaneously exposes the film with the image and storage a digital image file of the image in the digital image storage, the digital image file of the image having higher resolution than the film as exposed with the image, the film as exposed with the image serving as a security reference to ensure against tampering of the digital image file of the image.

15. The analog/digital camera of claim 14 wherein the data imprinter further comprises a data encoder that creates a dense graphic format of additional information.

16. The analog/digital camera of claim 15 wherein the dense graphic format further comprises a machine-readable bar code.

17. The analog/digital camera of claim 14 wherein the first lensing system further comprises a lensing system smaller than the second lensing system.

18. A method of generating images comprising:

generating a first optical image on a digital image transducer;

generating a second optical image at a focal plane of a photographic film; and essentially simultaneously exposing the photographic film with the second optical image and generating and storing a digital representation of the first optical image, the digital representation of the first optical image having higher resolution than the photographic film as exposed with the second optical image, the photographic film as exposed with the second optical image serving as a security reference to ensure against tampering of the digital representation of the first optical image.

19. The method of claim 18 wherein the steps of generating a second optical image and generating a first optical image further comprise the step of forming images of essentially the same scene on the photographic film and on the digital image transducer.

20. The method of claim 18 further comprising the step of encoding the data associated with the generation of the image.

21. The method of claim 18 wherein the step of encoding the data further comprises the step of creating a machine-readable bar code.

22. The method of claim 18 including providing a first lens generating the first optical image on the digital image transducer, and a second lens generating the second optical image on the photographic film.

* * * * *

UNITED STATES PATENT AND TRADEMARK OFFICE
CERTIFICATE OF CORRECTION

PATENT NO. : 6,553,187 B2  Page 1 of 1
DATED : April 22, 2003
INVENTOR(S) : Jones It is certified that error appears in the above-identified patent and that said Letters Patent is hereby corrected as shown below:

Column 5,
Line 5, delete "storage" and insert therefor -- stores --.

Signed and Sealed this

Fifteenth Day of June, 2004

JON W. DUDAS
*Acting Director of the United States Patent and Trademark Office*